United States Patent
Takeda

(10) Patent No.: US 9,806,315 B2
(45) Date of Patent: Oct. 31, 2017

(54) NONAQUEOUS ELECTROLYTE SECONDARY BATTERY AND METHOD OF MANUFACTURING THE SAME, AND SEPARATOR FOR NONAQUEOUS ELECTROLYTE SECONDARY BATTERY

(71) Applicant: TOYOTA JIDOSHA KABUSHIKI KAISHA, Toyota-shi, Aichi-ken (JP)

(72) Inventor: Kazuhisa Takeda, Toyota (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 1 day.

(21) Appl. No.: 14/831,306

(22) Filed: Aug. 20, 2015

(65) Prior Publication Data

US 2016/0056435 A1 Feb. 25, 2016

(30) Foreign Application Priority Data

Aug. 21, 2014 (JP) .................. 2014-168794

(51) Int. Cl.
| | | |
|---|---|---|
| *H01M 10/04* | (2006.01) | |
| *H01M 2/16* | (2006.01) | |
| *H01M 2/14* | (2006.01) | |
| *H01M 10/052* | (2010.01) | |
| *H01M 10/058* | (2010.01) | |
| *H01M 10/0525* | (2010.01) | |
| *H01M 10/0585* | (2010.01) | |

(52) U.S. Cl.
CPC ......... *H01M 2/1666* (2013.01); *H01M 2/145* (2013.01); *H01M 2/1653* (2013.01); *H01M 2/1673* (2013.01); *H01M 2/1686* (2013.01); *H01M 10/052* (2013.01); *H01M 10/058* (2013.01); *H01M 10/0525* (2013.01); *H01M 10/0585* (2013.01); *H01M 2300/0025* (2013.01)

(58) Field of Classification Search
CPC .................. H01M 10/052; H01M 10/0525
See application file for complete search history.

(56) References Cited

U.S. PATENT DOCUMENTS

| | | |
|---|---|---|
| 2002/0197536 A1 | 12/2002 | Mori et al. |
| 2007/0196738 A1* | 8/2007 | Ohata .................. H01M 2/145 429/246 |
| 2009/0111025 A1 | 4/2009 | Lee et al. |

(Continued)

FOREIGN PATENT DOCUMENTS

| | | |
|---|---|---|
| CN | 1393954 A | 1/2003 |
| CN | 101088183 A | 12/2007 |

(Continued)

*Primary Examiner* — Olatunji Godo
(74) *Attorney, Agent, or Firm* — Sughrue Mion, PLLC

(57) ABSTRACT

A method of manufacturing a nonaqueous electrolyte secondary battery includes: preparing a separator substrate; forming a porous layer, which contains at least a fluorophosphate and a binder, on a surface of the separator substrate; preparing an electrode body by laminating a positive electrode and a negative electrode to face each other with a separator including the porous layer interposed therebetween, in which the separator is arranged such that the porous layer faces the positive electrode; preparing a battery assembly including the electrode body and a nonaqueous electrolyte; and charging the battery assembly at least once.

6 Claims, 5 Drawing Sheets

(56) References Cited

U.S. PATENT DOCUMENTS

| | | | |
|---|---|---|---|
| 2013/0052543 A1* | 2/2013 | Ihara | H01M 10/0567 429/337 |
| 2013/0089771 A1* | 4/2013 | Nishikawa | H01M 2/162 429/145 |
| 2014/0045032 A1 | 2/2014 | Tanaka et al. | |
| 2014/0141313 A1 | 5/2014 | Takase et al. | |

FOREIGN PATENT DOCUMENTS

| | | |
|---|---|---|
| EP | 2190054 A1 | 5/2010 |
| JP | 2008-270199 A | 11/2008 |
| JP | 2012-243477 A | 12/2012 |
| JP | 2013114764 A | 6/2013 |
| JP | 2013247014 A | 12/2013 |
| JP | 2014-017089 A | 1/2014 |
| JP | 2014-035955 A | 2/2014 |
| JP | 2014-103083 A | 6/2014 |
| WO | 2006068428 A1 | 6/2006 |
| WO | 2009066916 A2 | 5/2009 |

\* cited by examiner

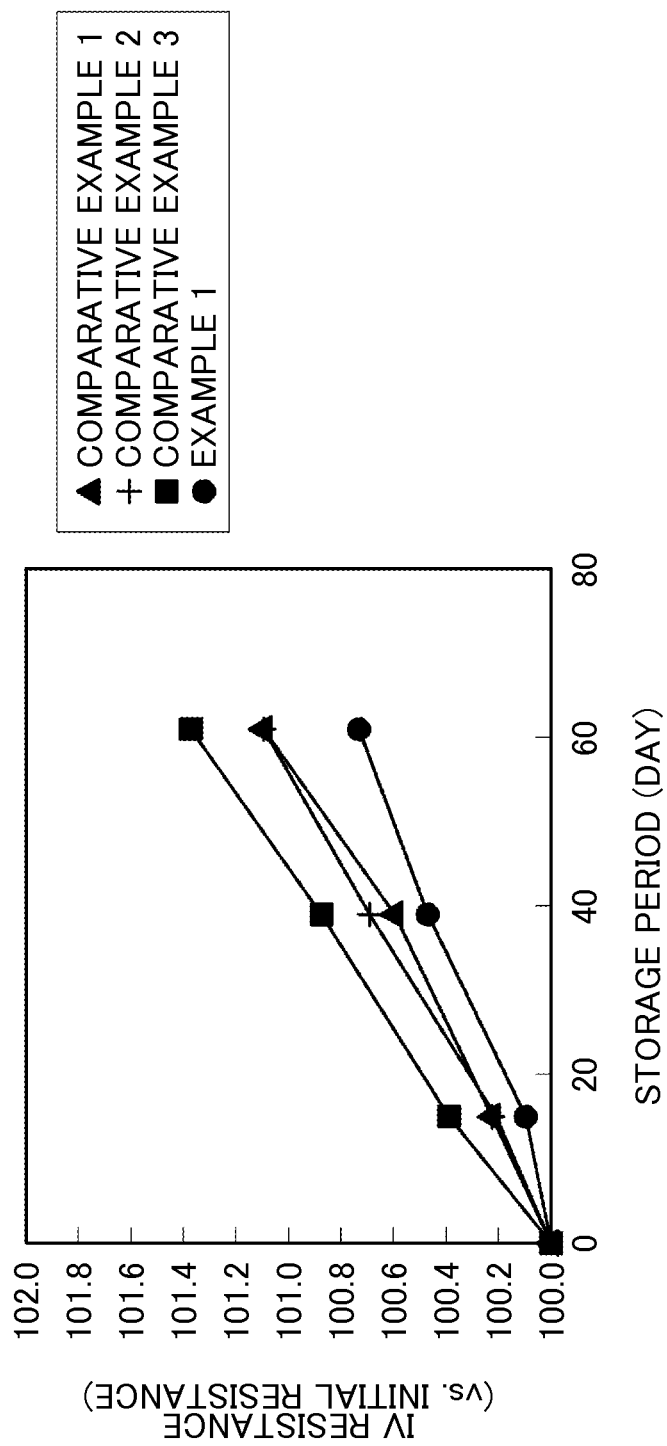

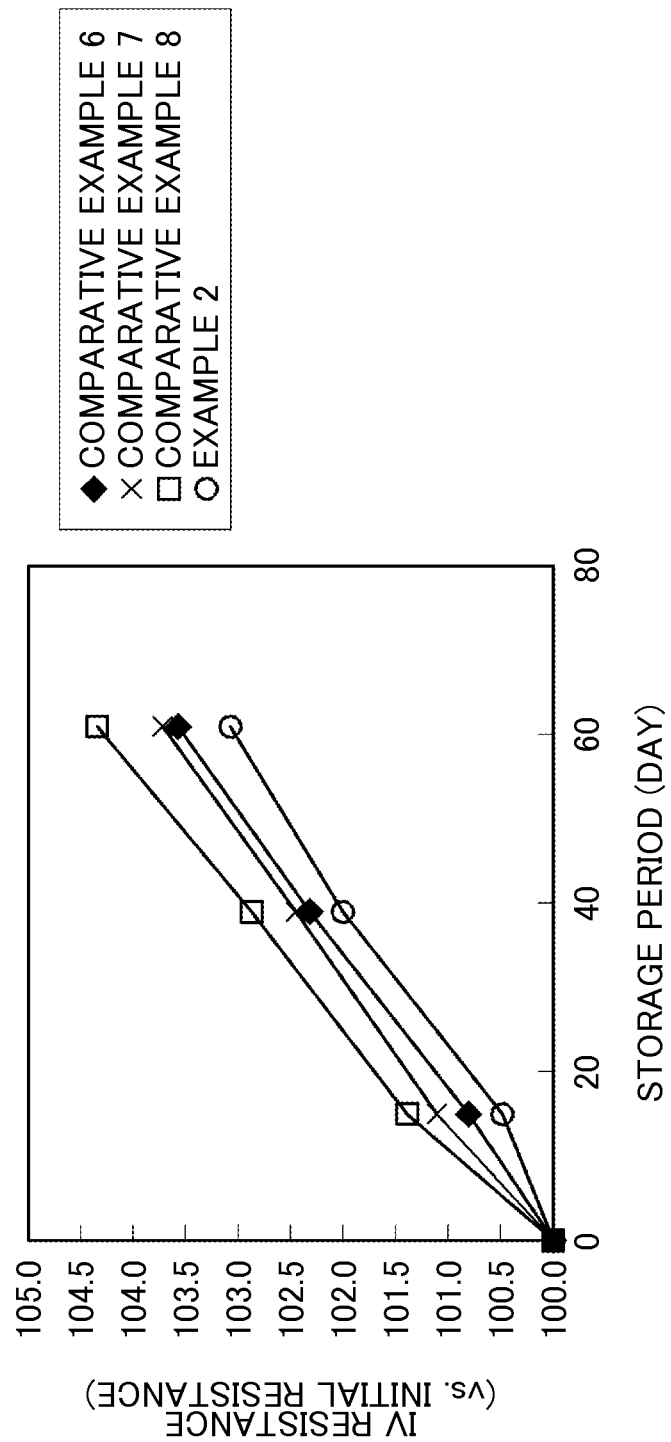

NONAQUEOUS ELECTROLYTE SECONDARY BATTERY AND METHOD OF MANUFACTURING THE SAME, AND SEPARATOR FOR NONAQUEOUS ELECTROLYTE SECONDARY BATTERY

INCORPORATION BY REFERENCE

The disclosure of Japanese Patent Application No. 2014-168794 filed on Aug. 21, 2014 including the specification, drawings and abstract is incorporated herein by reference in its entirety.

BACKGROUND OF THE INVENTION

1. Field of the Invention

The present invention relates to a nonaqueous electrolyte secondary battery and a method of manufacturing the same. Specifically, the invention relates to a separator for a nonaqueous electrolyte secondary battery and a nonaqueous electrolyte secondary battery which is manufactured using the separator.

2. Description of Related Art

In a nonaqueous electrolyte secondary battery such as a lithium ion secondary battery, additives are added to a nonaqueous electrolyte, for example, for one or two or more of the purposes including: improvement of the storability of the battery; improvement of cycle characteristics; improvement of input and output characteristics; and improvement of initial charge-discharge efficiency. For example, Japanese Patent Application Publication No. 2014-035955 (JP 2014-035955 A) describes that low-temperature discharge characteristics of a battery can be improved by adding a film forming agent (specifically, lithium difluorophosphate ($LiPO_2F_2$)) to a nonaqueous electrolyte.

Typically, the film forming agent added to the nonaqueous electrolyte is electrically decomposed (oxidation decomposition or reduction decomposition) on a positive electrode and/or a negative electrode to produce a protective film containing a decomposition product of the film forming agent on a surface of the electrode. As a result, an interface between the electrode (typically, an active material) and the nonaqueous electrolyte can be maintained in a stable state.

However, according to an investigation by the present inventors, it was found that there is room for improvement in the above-described technique. That is, in the battery disclosed in JP 2014-035955 A in which lithium difluorophosphate is added to the nonaqueous electrolyte, most (typically, 60% or more, for example, 80% or more with respect to the total addition amount) of the added lithium difluorophosphate is reduced and decomposed on the negative electrode and is deposited on the surface of the negative electrode as a film. Therefore, an excess amount of the film is formed on the negative electrode. Accordingly, the battery resistance may increase, and the intercalation of lithium ions may not follow the formation of the film. As a result, lithium metal is deposited on the surface of the negative electrode, which may decrease the input and output characteristics or durability (for example, Li deposition resistance) of the battery. On the other hand, since most of the added film forming agent is consumed on the negative electrode, the formation of the film on the positive electrode may be insufficient. As a result, for example, after the battery is exposed to a severe environment (for example, to a high-temperature environment of 50° C. or higher) for a long period of time, an interface between the positive electrode and the nonaqueous electrolyte may be unstable, and the battery resistance may increase.

SUMMARY OF THE INVENTION

The invention provides a nonaqueous electrolyte secondary battery in which an addition effect of a film forming agent is fully exhibited, and a decrease in battery characteristics (for example, an increase in battery resistance) is suppressed even after being exposed to severe conditions for a long period of time. The invention also provides a separator for a nonaqueous electrolyte secondary battery which realizes the above-described nonaqueous electrolyte secondary battery.

The present inventors conceived a configuration of forming a large amount of a film on a surface of a positive electrode. As a result of a thorough investigation, the present invention has been completed. A first aspect of the invention relates to a method of manufacturing a nonaqueous electrolyte secondary battery. The method includes: (1) preparing a separator substrate; (2) preparing a separator by applying a composition, which contains at least a fluorophosphate and a binder, to a surface of the separator substrate to form a porous layer on the surface of the separator substrate; (3) preparing an electrode body by arranging the separator such that the porous layer faces a positive electrode and laminating the positive electrode and a negative electrode to face each other with the separator interposed therebetween; (4) preparing a battery assembly comprising the electrode body and a nonaqueous electrolyte; and (5) charging the battery assembly at least once.

Since the porous layer containing the fluorophosphate is arranged on a surface of the separator facing the positive electrode, most of the fluorophosphate can be made to be present in the vicinity of the positive electrode. By charging the nonaqueous electrolyte secondary battery in this state, a large amount of a film derived from the fluorophosphate can be formed on the surface of the positive electrode as compared to a case where a nonaqueous electrolyte contains a fluorophosphate. As a result, for example, even after being exposed to severe conditions for a long period of time, a nonaqueous electrolyte secondary battery having high durability in which the battery resistance is suppressed can be realized.

The composition may further contain an inorganic filler in addition to the fluorophosphate and the binder. When the porous layer is prepared using the composition prepared as described above, the heat resistance or mechanical strength of the porous layer can be further improved.

The fluorophosphate may be, for example, a difluorophosphate or a monofluorophosphate. The fluorophosphate may contain the same cation species (charge carrying ion) as that of a supporting electrolyte. Examples of the fluorophosphate which can be used in, for example, a lithium ion secondary battery include lithium difluorophosphate ($Li_2PO_2F_2$) and lithium monofluorophosphate ($Li_2PO_3F$).

An amount of the fluorophosphate and an amount of the nonaqueous electrolyte in the composition may be adjusted such that a concentration of the fluorophosphate in the porous layer in terms of a concentration of the nonaqueous electrolyte is 0.05 mol/kg or more. As a result, the effects of the invention can be exhibited at a higher level. In this specification, "the concentration of the fluorophosphate in terms of the concentration of the nonaqueous electrolyte" refers to the amount (mol) of the fluorophosphate per unit mass (1 kg) of the nonaqueous electrolyte used for the construction of the battery.

The nonaqueous electrolyte may not contain the fluorophosphate. As a result, the excessive formation of the film derived from the fluorophosphate on the surface of the negative electrode can be suppressed at a higher level. Accordingly, the effects of the invention can be exhibited at a higher level.

According to the invention, there is provided a nonaqueous electrolyte secondary battery which is manufactured using the above-described method. In the nonaqueous electrolyte secondary battery, a large amount of a film derived from the fluorophosphate can be formed on the positive electrode side unlike in a battery of the related art in which a nonaqueous electrolyte contains a fluorophosphate. As a result, even after the battery is exposed to severe conditions, superior battery characteristics can be stably exhibited for a long period of time.

According to the invention, there is provided a separator which is used for a nonaqueous electrolyte secondary battery. The separator includes a porous layer containing a fluorophosphate that is formed on a surface thereof. The porous layer may contain an inorganic filler. By a nonaqueous electrolyte secondary battery containing the separator having the above-described configuration, the durability of the nonaqueous electrolyte secondary battery can be improved as described above.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 4 is a graph showing a relationship between the storage period in a high-temperature environment and the IV resistance when the total addition amount of $Li_2PO_2F_2$ in a battery is 0.432 g (0.004 mol); and FIG. 5 is a graph showing a relationship between the storage period in a high-temperature environment and the IV resistance when the total addition amount of $Li_2PO_2F_2$ in a battery is 0.216 g (0.002 mol).

DETAILED DESCRIPTION OF EMBODIMENTS

Figure 1:
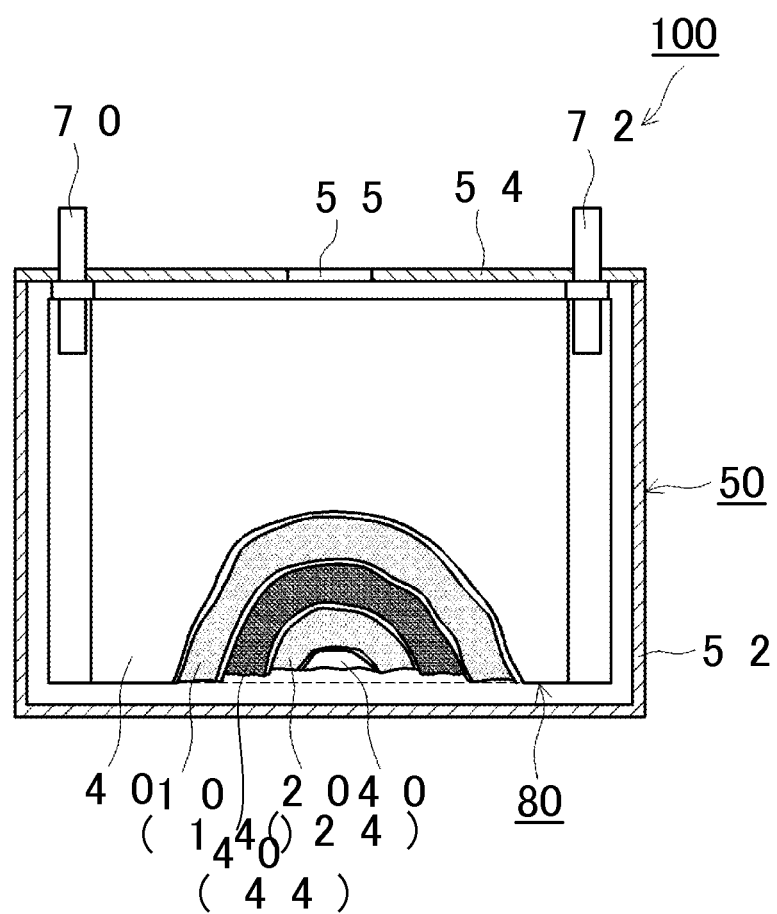
FIG. 1 is a vertical longitudinal sectional view schematically showing a nonaqueous electrolyte secondary battery according to an embodiment of the invention.

Hereinafter, embodiments of the invention will be described below. Matters (for example, a component of a battery which is not a characteristic of the invention) necessary to practice this invention other than those specifically referred to in this description may be understood as design matters based on the related art in the pertinent field for a person of ordinary skills in the art. The invention can be practiced based on the contents disclosed in this description and common technical knowledge in the subject field.

<Method of Manufacturing Nonaqueous Electrolyte Secondary Battery>

Briefly, a method of manufacturing a nonaqueous electrolyte secondary battery according to an embodiment of the invention includes the following steps: (1) separator substrate preparation; (2) porous layer formation; (3) electrode body preparation; (4) battery assembly preparation; and (5) charging. The above-described steps (1) and (2) can be understood as a method of manufacturing a separator for a nonaqueous electrolyte secondary battery according to the embodiment. Hereinafter, each step will be sequentially described.

(1) Separator Substrate Preparation

First, a separator substrate is prepared. The separator substrate is not particularly limited as long as it insulates a positive electrode and a negative electrode from each other and has a function of holding a nonaqueous electrolyte or a so-called shutdown function. Any substrate which is known as a separator for a nonaqueous electrolyte secondary battery can be used without any particular limitation. The separator substrate may be commercially available or may be prepared using a well-known method of the related art. Preferable examples of the separator substrate include a porous resin sheet (film) formed of a resin such as polyethylene (PE), polypropylene (PP), polyester, cellulose, or polyamide. The porous resin sheet may have a single-layer structure or a multilayer structure including two or more layers (for example, a three-layer structure (that is, a PP/PE/PP structure) in which a PP layer is laminated on opposite surfaces of a PE layer). Among these, a porous resin sheet which is formed of a polyolefin resin having a sufficiently low shutdown temperature of 80° C. to 140° C. can be preferably used. The average thickness of the separator substrate is, for example, 10 μm to 40 μm from the viewpoints of strongly preventing internal short-circuit (the breaking of the separator) while appropriately securing the permeability of charge carrying ions. In addition, the porosity of the separator substrate may be, for example, 20 vol % to 90 vol % (typically 30 vol % to 80 vol % and preferably 40 vol % to 60 vol %) in consideration of, for example, the permeability of charge carrying ions and mechanical strength. In this specification, "porosity" refers to a value which is obtained by dividing a total pore volume ($cm^3$) by the apparent volume ($cm^3$) and multiplying the divided value by 100, the total pore volume being obtained by measurement using a mercury porosimeter. The apparent volume can be calculated as the product of the area ($cm^2$) in a plan view and the thickness (cm).

(2) Porous Layer Formation

Next, a porous layer, which contains at least a fluorophosphate and a binder, is formed on a surface of the separator substrate. In a preferable embodiment, the porous layer is directly formed on the surface of the separator substrate. Specifically, first, a fluorophosphate, a binder, and optionally used materials are kneaded with each other in an appropriate solvent to prepare a paste or slurry composition (composition for forming the porous layer). By kneading the fluorophosphate and the binder with each other, the binder can be firmly attached to the surface of the fluorophosphate. This composition is applied to one surface of the prepared separator substrate and is dried. As a result, the separator including the porous layer that is formed on the surface of the separator substrate can be prepared. The fluorophosphate is firmly fixed to the porous layer prepared as described above. Accordingly, for example, even when the porous layer is in contact with the nonaqueous electrolyte during battery assembly construction which is subsequently performed, the fluorophosphate is less likely to be eluted from the porous layer, and a large amount of the fluorophosphate can be maintained in the vicinity of the positive electrode during "(5) charging" described below.

As the fluorophosphate, any known material (so-called, a film forming agent) which is electrically decomposed in "(5) charging" described below so as to form a protective film containing a decomposition product thereof on the surface of the electrode can be used without any particular limitation. From the viewpoint of forming a more stable film on the surface of the electrode, difluorophosphate or monofluorophosphate can be preferably used. As a result, the durability (for example, cycle characteristics or battery characteristics after high-temperature storage) of the battery can be further improved, and the effects of the invention can be exhibited at a higher level. Among these, a compound containing the same cation species (charge carrying ion) as that of the supporting electrolyte is particularly preferable. For example, in a lithium ion secondary battery, lithium difluorophosphate ($Li_2PO_2F_2$) and lithium monofluorophosphate ($Li_2PO_3F$) can be more preferably used. Here, a case where the charge carrier is a lithium ion will be described in detail. However, a sodium ion or a magnesium ion may also be used.

The amount of the fluorophosphate contained in the porous layer is not particularly limited as long as a sufficient amount of the film is formed on the surface of the positive electrode. For example, the amount of the fluorophosphate contained in the porous layer varies depending on the kind and characteristics (for example, average particle size or specific surface area) of the positive electrode active material and the characteristics (for example, porosity or density) of the positive electrode, but may be adjusted such that the concentration of the fluorophosphate in the porous layer in terms of the concentration of the nonaqueous electrolyte is 0.05 mol/kg or more, for example, 0.07 mol/kg or more from the viewpoint of forming a sufficient amount of the film on the surface of the positive electrode. For example, when about 40 g of the nonaqueous electrolyte is used during the battery construction, it is preferable that the porous layer contains 0.002 mol or more, for example, 0.0028 mol or more of the fluorophosphate. From the viewpoint of strongly preventing the formation of an excess amount of the film on a surface of a positive electrode, the amount of the fluorophosphate contained in the porous layer may be adjusted such that the concentration of the fluorophosphate in the porous layer in terms of the concentration of the nonaqueous electrolyte is 0.15 mol/kg or less, for example, 0.10 mol/kg or less. For example, when about 40 g of the nonaqueous electrolyte is used during the battery construction, it is preferable that the porous layer contains 0.006 mol or less, for example, 0.004 mol or less of the fluorophosphate. By adjusting the concentration of the fluorophosphate in the porous layer to be in the above-described range, a battery can be suitably realized in which the addition effect of the fluorophosphate is fully exhibited, and not only high durability (high-temperature storage characteristics) but also high energy density or high input and output densities can be obtained.

As the binder, a known material which can be contained in the separator for a nonaqueous electrolyte secondary battery can be used without any particular limitation. Preferable examples of the binder include acrylic polymers containing acrylic acid, methacrylic acid, an acrylate, or a methacrylate as a major copolymer component; rubbers such as styrene-butadiene rubber (SBR), acrylonitrile-butadiene copolymer rubber (NBR), acrylonitrile-isoprene copolymer rubber (NIR), and acrylonitrile-butadiene-isoprene copolymer rubber (NBIR); polyolefin polymers such as polyethylene; cellulose polymers such as carboxymethyl cellulose, methyl cellulose, and hydroxypropyl methylcellulose; and urethane polymers such as polyurethane. Among these, an acrylic polymer can be preferably used because it has strong adhesion (typically, initial tackiness or adhesion strength) and is electrochemically stable. In a preferable embodiment, an acrylic polymer is used in combination with other binders. For example, a combination of an acrylic polymer with a cellulose polymer may be used.

Examples of the optionally used materials include an inorganic filler (inorganic compound particles). By the porous layer containing an inorganic filler, for example, even when the internal temperature of the battery is high due to internal short-circuit or the like, an insulating state between a positive electrode and a negative electrode can be suitably maintained. As the inorganic filler, a known material which can be contained in the separator for a nonaqueous electrolyte secondary battery can be used without any particular limitation. Preferable examples of the inorganic filler include inorganic oxides such as alumina (aluminum oxide; $Al_2O_3$), hydrated alumina (for example, boehmite ($Al_2O_3.H_2O$)), silica (silicon oxide; $SiO_2$), and magnesia (magnesium oxide; MgO); and inorganic nitrides such as silicon nitride ($Si_3N_4$) and aluminum nitride (AlN). Among these, an inorganic oxide can be preferably used from the viewpoints of heat resistance, durability (mechanical strength), and cost. For example, aluminum has relatively small specific gravity among the metals. Therefore, in particular, alumina or hydrated alumina can be preferably used from the viewpoint of reducing the weight of the battery. In addition, as the optionally used materials, for example, an organic filler (high-heat-resistance resin particles) or various dispersants and thickeners can also be optionally used.

A component ratio of a composition for forming the porous layer is not particularly limited. For example, when approximately 90 mass % or more (typically, 95 mass % to 100 mass %) of the total mass of the composition for forming the porous layer is composed of the fluorophosphate and the binder, a ratio of the mass of the fluorophosphate to the total mass of the composition may be about 30 mass % to 80 mass % (for example, 40 mass % to 70 mass %). A ratio of the mass of the binder to the total mass of the composition may be about 20 mass % to 70 mass % (for example, 30 mass % to 60 mass %). In another example, when approximately 90 mass % or more (typically, 95 mass % to 100 mass %) of the total mass of the composition for forming the porous layer is composed of the fluorophosphate, the binder, and the inorganic filler, a ratio of the mass of the fluorophosphate to the total mass of the composition may be suitably more than about 1 mass %, (typically 2 mass % or more and preferably 4 mass % or more) from the viewpoint of exhibiting the effects of the invention at a high level. When the composition contains the inorganic filler, the upper limit of a ratio of the mass of the fluorophosphate to the total mass of the composition may be, for example, usually less than 10 mass % (typically 9 mass % or less; for example, 8 mass % or less) from the viewpoint of reducing the battery resistance. A ratio of the mass of the binder to the total mass of the composition may be, for example, 1 mass % to 10 mass % (typically, about 1 mass % to 5 mass %). A ratio of the mass of the inorganic filler to the total mass of the composition may be suitably more than about 80 mass % (typically 85 mass % to 98 mass %; for example, 87 mass % to 95 mass %).

As a solvent used during the preparation of the composition, any one of an aqueous solvent and an organic solvent can be used. For example, water can be used as the aqueous solvent. For example, N-methyl-2-pyrrolidone (NMP) can be used as the organic solvent. The coating of the composition can be performed using a well-known coater of the related art such as a gravure coater, a slit coater, a die coater, a comma coater, or a dip coater. The drying of the composition can be performed using a well-known drying method such as drying by heating or vacuum drying.

In another preferable embodiment, an inorganic filler layer (a so-called heat resistance layer) and the porous layer are formed on the surface of the separator substrate in this order. Regarding the materials (for example, the inorganic filler, the binder, and the fluorophosphate) constituting the inorganic filler or the porous layer, the above-described examples can be appropriately used. Each of the layers can be formed using the same method as described above.

In this way, the separator in which the porous layer is formed on the surface of the separator substrate (the separator including the porous layer) can be prepared.

(3) Preparation of Electrode Body

Next, an electrode body is prepared by laminating a positive electrode and a negative electrode to face each other with the separator including the porous layer interposed therebetween. For example, in a high energy density battery which is mounted in a vehicle, a wound electrode body obtained by laminating a sheet-shaped positive electrode and a negative electrode with a sheet-shaped separator interposed therebetween and winding the obtained laminate can be preferably used.

Typically, the positive electrode includes: a positive electrode current collector; and a positive electrode active material layer that contains a positive electrode active material and is attached to the positive electrode current collector. As the positive electrode current collector, a conductive member formed of highly conductive metal (for example, aluminum, nickel, or titanium) is preferably used. The positive electrode active material layer includes at least a positive electrode active material. As the positive electrode active material, one kind or two or more kinds may be used among various materials which can be used as a positive electrode active material of a nonaqueous electrolyte secondary battery. Preferable examples of the positive electrode active material include layered or spinel type lithium transition metal composite oxide materials (for example, $LiNiO_2$, $LiCoO_2$, $LiMn_2O_4$, $LiNi_{0.33}Co_{0.33}Mn_{0.33}O_2$, and $LiNi_{0.5}Mn_{1.5}O_4$) and olivine type materials (for example, $LiFePO_4$). Among these, a lithium nickel cobalt manganese composite oxide having a layered structure which contains Li, Ni, Co, and Mn as constituent elements is preferable from the viewpoints of heat stability and energy density.

The positive electrode active material is typically particulate (powder-like). The average particle size may be about 0.1 µm or more (typically 0.5 µm or more; for example, 5 µm or more) and may be about 20 µm or less (typically 15 µm or less; for example, 10 µm or less). The specific surface area may be about 0.1 $m^2/g$ or more (typically 0.5 $m^2/g$ or more) and may be about 20 $m^2/g$ or less (typically 10 $m^2/g$ or less; for example, 5 $m^2/g$ or less; preferably 2 $m^2/g$ or less). A positive electrode active material satisfying one or two of the above-described characteristics can maintain an appropriate porosity and superior conductivity in the positive electrode active material layer. Accordingly, superior battery characteristics (for example, high energy density or high input and output characteristics) can be exhibited. In this specification, "average particle size" refers to a particle size (also referred to as "$D_{50}$ particle size" or "median size") corresponding to a cumulative value of 50 vol % in order from the smallest particle size in a volume particle size distribution based on a general laser diffraction laser scattering method. In this specification, "specific surface area" refers to a specific surface area (BET specific surface area) which is measured with a BET method (for example, a multi-point BET method) using nitrogen gas.

In addition to the positive electrode active material, the positive electrode active material layer may optionally contain one material or two or more materials which can be used as components of a positive electrode active material layer in a general nonaqueous electrolyte secondary battery. Examples of the material include a conductive material and a binder. Examples of the conductive material include carbon materials such as various carbon blacks (for example, acetylene black and Ketjen black), activated carbon, graphite, and carbon fiber. Examples of the binder, include vinyl halide resins such as polyvinylidene fluoride (PVdF); and polyalkylene oxides such as polyethylene oxide (PEO). In addition, the positive electrode active material layer may further contain various additives (for example, a dispersant or a thickener) within a range where the effects of the invention do not significantly deteriorate.

The average thickness of the positive electrode active material layer per single surface may be about 20 µm or more (typically 40 µm or more; for example, 50 µm or more) and may be about 100 µm or less (typically 80 µm or less). The porosity of the positive electrode active material layer may be typically 10 vol % to 50 vol % (for example, 20 vol % to 40 vol %). The density of the positive electrode active material layer may be typically 1.5 $g/cm^3$ or more (for example, 2 $g/cm^3$ or more) and may be about 4 $g/cm^3$ or less (for example, 3.5 $g/cm^3$ or less). By satisfying one or two or more of the above-described characteristics, high energy density and high input and output densities can be simultaneously realized at a higher level. In this specification, "density" refers to a value obtained by dividing the mass (g) of an active material layer by the apparent volume ($cm^3$) thereof. The apparent volume can be calculated as the product of the area ($cm^2$) in a plan view and the thickness (cm).

Typically, the negative electrode includes: a negative electrode current collector; and a negative electrode active material layer that contains a negative electrode active material and is attached to the negative electrode current collector. As the negative electrode current collector, a conductive member formed of highly conductive metal (for example, copper, nickel, titanium, or stainless steel) is preferable. The negative electrode active material layer includes at least a negative electrode active material. As the negative electrode active material, one kind or two or more kinds may be used among various materials which can be used as a negative electrode active material of a nonaqueous electrolyte secondary battery. Preferable examples of the negative electrode active material include various carbon materials such as graphite, non-graphitizable carbon (hard carbon), graphitizable carbon (soft carbon), carbon nanotube, and a combination thereof. Among these, from the viewpoint of energy density, a graphite-based material containing 50 mass % or more of graphite with respect to the total mass of the negative electrode active material is preferable.

In addition to the negative electrode active material, the negative electrode active material layer may optionally contain one material or two or more materials which can be used as components of a negative electrode active material layer in a general nonaqueous electrolyte secondary battery. Examples of the material include a binder and various additives. Examples of the binder include styrene-butadiene rubber (SBR), polyvinylidene fluoride (PVdF), and polytetrafluoroethylene (PTFE). Moreover, the negative electrode active material layer may further appropriately contain various additives such as a thickener, a dispersant, or a conductive material. Examples of the thickener include celluloses such as carboxymethyl cellulose (CMC) and methyl cellulose (MC).

In the manufacturing method according to the embodiment, during the preparation of the electrode body, the separator is arranged such that the porous layer thereof faces the positive electrode. The porous layer of the separator contains the fluorophosphate. Therefore, according to the above-described configuration, a large amount of the fluorophosphate is present in a region closer to the positive electrode than the negative electrode.

(4) Preparation of Battery Assembly

Next, a battery assembly is prepared using the electrode body and a nonaqueous electrolyte. Typically, the electrode body is accommodated in a battery case, and the nonaqueous electrolyte is injected into the battery case. The battery case is preferably formed of, for example, a light metal material such as aluminum. Typically, the nonaqueous electrolyte contains a nonaqueous solvent and a supporting electrolyte. As the nonaqueous solvent, various organic solvents which can be used in a nonaqueous electrolyte for a nonaqueous electrolyte secondary battery can be adopted without any particular limitation. Preferable examples of the nonaqueous solvent include aprotic solvents such as carbonates, esters, ethers, nitriles, sulfones, and lactones. Among these, carbonates such as ethylene carbonate (EC), diethyl carbonate (DEC), dimethyl carbonate (DMC), and ethyl methyl carbonate (EMC) can be preferably used. The supporting electrolyte is not particularly limited as long as it contains a charge carrier (for example, a lithium ion, a sodium ion, or a magnesium ion; in a lithium ion secondary battery, a lithium ion). For example, a known material which can be used as a supporting electrolyte for a nonaqueous electrolyte secondary battery can be used without any particular limitation. For example, examples of the supporting electrolyte which can be used in a lithium ion secondary battery include lithium salts such as $LiPF_6$ and $LiBF_4$.

In addition to the above-described components, optionally, the nonaqueous electrolyte may further contain various additives within a range where the effects of the invention do not significantly deteriorate. These additives are used for one or two or more of the purposes including: improvement of the storability of the battery; improvement of input and output characteristics; improvement of cycle characteristics; and improvement of initial charge-discharge efficiency. Specific examples of the additives include the above-described fluorophosphate (typically, difluorophosphates; for example, lithium difluorophosphate), lithium bis(oxalato)borate (Li[B$(C_2O_4)_2$]), vinylene carbonate (VC), and fluoroethylene carbonate (FEC). In a preferable embodiment, the nonaqueous electrolyte does not contain the above-described fluorophosphate. As a result, a large amount of the fluorophosphate can be made to be present in the vicinity of the positive electrode. In other words, the amount of the fluorophosphate present in the vicinity of the negative electrode can be minimized.

(5) Charging

Next, the battery assembly is charged at least once. Typically, an external power supply is connected between the positive electrode and the negative electrode of the battery assembly to perform the charging until a voltage between the positive and negative electrodes is a predetermined value. As a result, the fluorophosphate is electrically decomposed (oxidation decomposition or reduction decomposition) on the positive electrode and/or the negative electrode. In the manufacturing method according to the embodiment, most of the fluorophosphate is present in the vicinity of the positive electrode. Therefore, the fluorophosphate is oxidized and decomposed mainly on the positive electrode. A protective film containing a decomposition product of the fluorophosphate is formed on the surface of the positive electrode. As a result, an interface between the positive electrode active material and the nonaqueous electrolyte is stabilized, and a nonaqueous electrolyte secondary battery having superior oxidation resistance can be manufactured.

The charging method may be constant-current charging (CC charging) in which a battery is charged to a predetermined voltage at a constant current or may be a constant current-constant voltage charging (CCCV charging) in which a battery is held at a constant voltage for a predetermined amount of time after CC charging. A current rate during charging may be about 1/100 C to 5 C. From the viewpoint of uniformly forming the film derived from the fluorophosphate on the surface of the electrode, it is preferable that the charging is performed at a relatively low rate of about 1/10 C to 1 C. The voltage between the positive and negative electrodes (typically, the maximum achieved voltage; for example, the voltage after the completion of charging) may be adjusted to be equal to or lower than the upper limit voltage of the battery during normal use. Specifically, although depending on, for example, the kind of the active material to be used and the kind of the nonaqueous solvent to be used, the voltage between the positive and negative electrode may be about 3.8 V to 4.2 V. The charging may be performed once or may be performed two times or more, for example, while performing discharging therebetween. "1 C" refers to an amount of current at which the battery capacity (Ah) estimated from theoretical capacity of the positive electrode can be charged in one hour.

In the nonaqueous electrolyte secondary battery manufactured as described above, a large amount of the film derived from the fluorophosphate (containing a decomposition product of the fluorophosphate) is formed on the surface of the positive electrode. More specifically, the film containing fluorine, phosphorus, oxygen, or lithium as a constituent element, that is, the film containing a component such as $PO_2F_2^-$, $PO_3F^-$, $PO_4^{3-}$, or LiF can be formed on the surface of the positive electrode. The amount of film components contained per unit area of the positive electrode may be higher than that of a battery of the related art. That is, in a battery of the related art, generally, a nonaqueous electrolyte contains a fluorophosphate. Therefore, as described above, most of the fluorophosphate contained in the battery is reduced and decomposed on a negative electrode and is deposited on a surface of the negative electrode as a film. In other words, the amount of the film components contained per unit area of the negative electrode is more than the amount of the film components contained per unit area of the positive electrode. For example, the amount of the film components contained per unit area of the negative electrode may be 1.5 times or more (for example, 2 times or more; in particular 3 times or more) the amount of the film components contained per unit area of the positive electrode. Therefore, since an excess amount of the film is present on the negative electrode, battery characteristics decreases, the formation of the film on the positive electrode is insufficient, and the durability may be insufficient. However, in the nonaqueous electrolyte secondary battery according to the embodiment, a variation in the amount of the film is more suitably suppressed. For example, the amount of the film components contained per unit area of the positive electrode may be substantially the same as the amount of the film components contained per unit area of the negative electrode. As a result, for example, even after being exposed to severe conditions for a long period of time, a nonaqueous electrolyte secondary battery having high durability in which the battery resistance is suppressed can be realized. By measuring the amounts of the film on the positive and negative electrodes, a difference from a battery of the related art in which a nonaqueous electrolyte contains a fluorophosphate can be clearly recognized.

The amount of the film formed on the surface of the electrode can be quantitatively measured using a general method such as ion chromatography (IC), inductively coupled plasma-atomic emission spectroscopy (ICP-AES), or X-ray absorption fine structure spectroscopy (XAFS). In a specific example, first, the battery is disassembled, and the electrode (active material layer) is pulled out from the battery. Next, the electrode is dipped and washed in an appropriate solvent (for example, EMC) and then is cut into a measurement sample having a predetermined size. Next, the measurement sample is dipped in an appropriate solvent (for example, pure water) for a predetermined amount of time (for example, 1 minute to 30 minutes) such that the film components (ion components derived from fluorophosphate) as measurement objects are extracted in the solvent. This solution is provided for ion chromatography to determine the quantitative value of each ion component as the measurement object. The sum of the quantitative values ($\mu$M) of the ions as the measurement objects is divided by the area ($cm^2$) of the active material layer provided for the measurement. As a result, the amount of the film ($\mu M/cm^2$) contained per unit area can be obtained.

According to the investigation by the present inventors, when a fluorophosphate is present not on a surface of a separator but on a positive electrode (for example, on a surface of a positive electrode active material layer or in the inside thereof), the workability may decrease, or the battery performance may decrease. That is, in a configuration in which a fluorophosphate is present in the inside of the positive electrode active material layer (for example, a composition for forming an positive electrode active material layer contains the fluorophosphate), it is considered that most of the fluorophosphate is decomposed, which causes an increase in battery resistance, a decrease in input and output characteristics, or a decrease in durability. As described above, the positive electrode active material layer is a porous layer (having high porosity). Therefore, when a porous layer containing a fluorophosphate is formed on a surface of the positive electrode active material layer, a complex manufacturing process such as a transfer process may be required. That is, it is considered that the configuration of the battery according to the embodiment (configuration in which the fluorophosphate is present on the positive-electrode-side surface of the separator) is superior to the above-described configuration from the viewpoints of workability, production efficiency, and battery characteristics.

<Embodiment of Nonaqueous Electrolyte Secondary Battery>

Although it is not intended to limit the invention, a nonaqueous electrolyte secondary battery according to an embodiment of the invention in which a wound electrode body and a nonaqueous electrolytic are accommodated in a flat rectangular (box-shaped) battery case will be described as an example. In addition, in the following drawings, parts or portions having the same function are represented by the same reference numerals, and the repeated description thereof will not be made or will be simplified. In each drawing, a dimensional relationship (for example, length, width, or thickness) does not necessarily reflect the actual dimensional relationship.

FIG. 1 is an exploded cross-sectional view schematically showing a cross-sectional structure of a nonaqueous electrolyte secondary battery 100 according to the embodiment of the invention. In this nonaqueous electrolyte secondary battery 100, an electrode body (wound electrode body) 80 and a nonaqueous electrolytic (not shown) are accommodated in a flat box-shaped battery case 50, the electrode body 80 having a configuration in which an elongated positive electrode sheet 10 and an elongated negative electrode sheet 20 are wounded flat with an elongated separator sheet 40 interposed therebetween. The battery case 50 includes: a flat rectangular battery case body 52 having an open upper end; and a lid 54 that covers the opening. In a top surface (that is, the lid 54) of the battery case 50, a positive electrode terminal 70 for external connection, which is electrically connected to the positive electrode of the wound electrode body 80, and a negative electrode terminal 72, which is electrically connected to the negative electrode of the wound electrode body 80, are provided. As in the case of a battery case of a nonaqueous electrolyte secondary battery in the related art, the lid 54 further includes a safety valve 55 for discharging gas, produced from the inside of the battery case 50, to the outside of the battery case 50.

Figure 2:
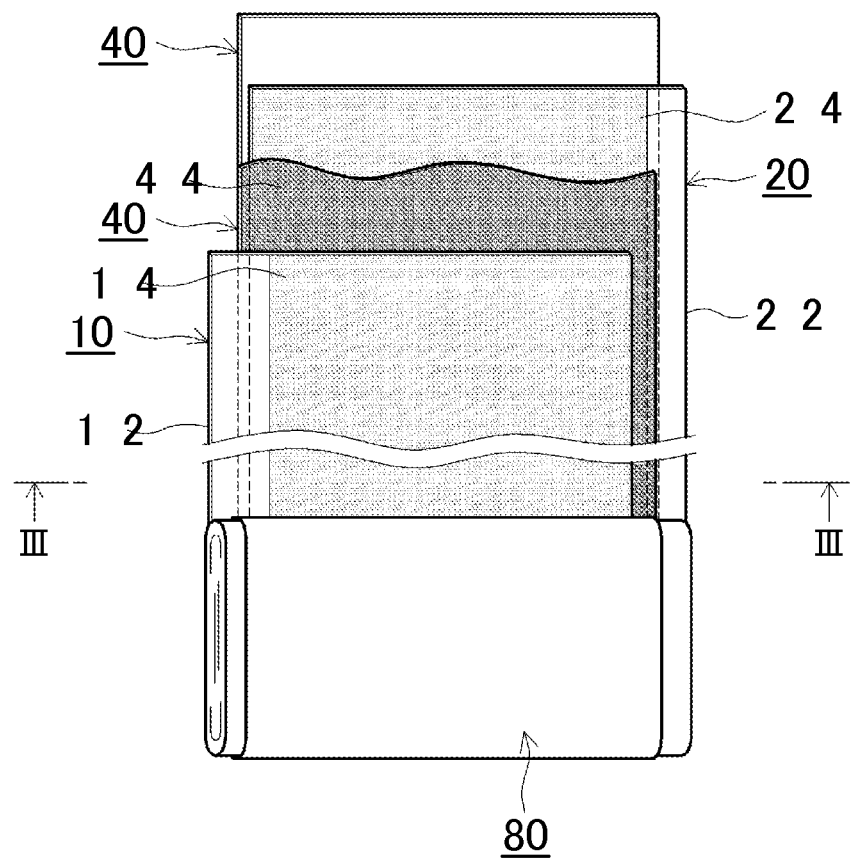
FIG. 2 is a schematic diagram showing a configuration of a wound electrode body of FIG. 1.
Figure 3:
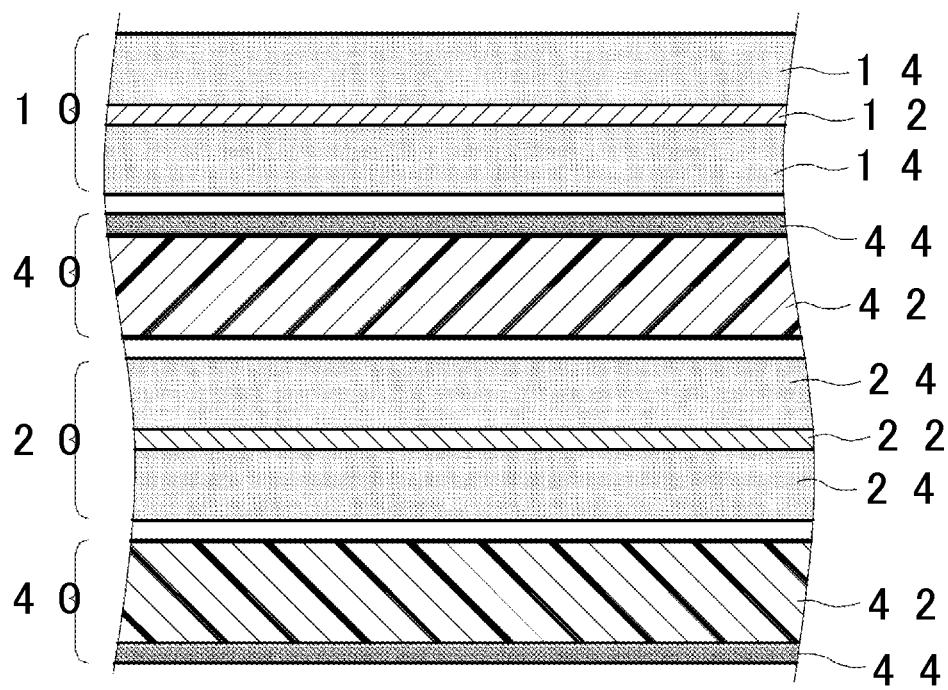
FIG. 3 is a sectional view showing the wound electrode body taken along line III-III of FIG. 2.

FIG. 2 is a schematic diagram showing a configuration of the flat wound electrode body 80 shown in FIG. 1. FIG. 3 is a schematic diagram showing a cross-sectional structure of the wound electrode body 80 taken along III-III line of FIG. 2. In FIG. 3, spaces are provided between the respective components for easy understanding. However, in the actual battery, generally, the components are disposed such that the respective components opposite each other (positive electrode sheet 10/separator sheet 40/negative electrode sheet 20) are in contact with each other. As shown in FIGS. 2 and 3, this wound electrode body 80 has an elongated sheet structure (sheet-shaped electrode body) in a step before the assembly of the wound electrode body 80. The positive electrode sheet 10 includes an elongated positive electrode current collector 12; and a positive electrode active material layer 14 that is formed on at least one surface (here, on both surfaces) in a longitudinal direction. The negative electrode sheet 20 includes an elongated negative electrode current collector 22; and a negative electrode active material layer 24 that is formed on at least one surface (here, on both surfaces) in a longitudinal direction. In addition, two separators (separator sheets) 40 having an elongated sheet shape are arranged between the positive electrode active material layer 14 and the negative electrode active material layer 24 as an insulating layer for preventing direct contact therebetween. The separator sheet 40 includes an elongated separator substrate 42; and a porous layer 44 that is formed on at least one surface (typically, on a single surfaces) in a longitudinal direction.

At the center of the wound electrode body 80 in a winding axial direction, a winding core portion (that is, a laminate in which the positive electrode sheet 10, the negative electrode sheet 20, and the separator sheets 40 are densely laminated) is formed. In addition, at opposite end portions of the wound electrode body 80 in the winding axial direction, a part of electrode active material layer non-forming portions (current collector exposure portions) of the positive electrode sheet 10 and the negative electrode sheet 20 protrude from the winding core portion to the outside, respectively. In the protrusion on the positive electrode side and the protrusion on the negative electrode side, a positive electrode current collector plate and a negative electrode current collector plate are provided, respectively, and are electrically connected to the positive electrode terminal 70 (FIG. 1) and the negative electrode terminal 72 (FIG. 1), respectively.

<Use of Nonaqueous Electrolyte Secondary Battery>

The nonaqueous electrolyte secondary battery (for example, a lithium ion secondary battery) according to the embodiment can be used in various applications. For example, in the nonaqueous electrolyte secondary battery according to the embodiment, high battery characteristics can be maintained even after being exposed to a severe environment such as a high-temperature environment (for example, under blazing sun) for a long period of time. Specifically, an increase in battery resistance is suppressed, and superior input and output characteristics can be exhibited for a long period of time. Accordingly, the nonaqueous electrolyte secondary battery can be preferably used, for example, in applications in which a storage or operating environment may be at a high temperature and in applications in which high input and output densities are required. Examples of the applications include a power source (driving power supply) for a vehicle-mounted motor. The type of the vehicle is not particularly limited, and examples thereof include a plug-in hybrid vehicle (PHV), a hybrid vehicle (HV), an electric vehicle (EV), an electric truck, an electric scooter, an electric-assisted bicycle, an electric wheelchair, and an electric railway. This nonaqueous electrolyte secondary battery may be used in the form of a battery pack in which plural secondary batteries are connected to each other in series and/or in parallel.

Hereinafter, several examples relating to the invention will be described, but the specific examples are not intended to limit the invention.

[I. Verification of Effects of Porous Layer Containing Fluorophosphate]

Two kinds of separators A and B were prepared under the same conditions except that conditions regarding whether or not a fluorophosphate was contained therein were different. Characteristics of batteries which were manufactured using these separators were evaluated.

<Preparation of Separator>

First, as a sheet-shaped separator substrate, a porous resin sheet having an average thickness of 20 μm and a three-layer structure (PP/PE/PP structure) in which a PP layer was laminated on opposite surfaces of a PE layer was prepared.

Preparation of Separator A (Not Containing Fluorophosphate)

Boehmite as an inorganic filler; an acrylic polymer as a binder; and carboxymethyl cellulose (CMC) were weighed at a mass ratio of 95:2.5:2.5. These materials were dispersed or dissolved in water to prepare a paste composition for forming a porous layer. This composition was applied to a single surface of the separator substrate such that the coating amount thereof was 0.75 mg/cm² and was dried. In this way, the separator A was obtained including: the separator substrate; and the porous layer not containing a fluorophosphate (to which a fluorophosphate was not added) that was formed on the single surface of the separator substrate.

Preparation of Separator B (Containing Fluorophosphate)

Boehmite as an inorganic filler; $LiPO_2F_2$ as a fluorophosphate; an acrylic polymer as a binder; and CMC were weighed at a mass ratio of 87.8:7.6:2.3:2.3. These materials were dispersed or dissolved in water to prepare a paste composition for forming a porous layer. This composition was applied to a single surface of the separator substrate such that the coating amount thereof was 0.81 mg/cm² and was dried. In this way, the separator B was obtained including: the separator substrate; and the porous layer containing the fluorophosphate that was formed on the single surface of the separator substrate.

<Preparation of Nonaqueous Electrolyte Secondary Battery>

First, $LiNi_{1/3}Co_{1/3}Mn_{1/3}O_2$ as a positive electrode active material; acetylene black (AB) as a conductive material; and polyvinylidene fluoride (PVdF) as a binder were weighed at a mass ratio of 90:8:2. These materials were dispersed or dissolved in N-methyl-2-pyrrolidone (NMP) to prepare a paste composition for forming a positive electrode active material layer. This composition was applied to a positive electrode current collector (aluminum foil) having an average thickness of 15 μm such that the coating amount thereof was 12 mg/cm², was dried, and was rolled using a roll pressing machine. As a result, a sheet-shaped positive electrode was prepared. Next, natural graphite as a negative electrode active material; styrene-butadiene rubber (SBR) as a binder; and CMC were weighed at a mass ratio of 98:1:1. These materials were dispersed or dissolved in water to prepare a paste composition for forming a negative electrode active material layer. This composition was applied to a negative electrode current collector (copper foil) having an average thickness of 10 μm such that the coating amount thereof was 7.5 mg/cm², was dried, and was rolled using a roll pressing machine. As a result, a sheet-shaped negative electrode was prepared.

The prepared positive electrode and the prepared negative electrode were wound with the separator interposed therebetween to prepare an electrode body (Comparative Examples 1 to 3 and Example 1). At this time, the kind and direction of the separator were configured as shown in Table 1 below. This electrode body was accommodated in a square battery case, and 40 g of a nonaqueous electrolytic solution having a composition shown in Table 1 below was injected into the battery case. As a result, battery assemblies (Comparative Examples 1 to 3 and Example 1) were prepared. In all the battery assemblies, the amount of $LiPO_2F_2$ contained therein was the same (0.432 g≅0.004 mol). For example, in Comparative Example 3 and Example 1, the amount of $LiPO_2F_2$ contained in the porous layer of the separator was designed to be 0.432 g.

TABLE 1

Configuration (1) of Battery Assembly

| | Separator | | Composition of Nonaqueous Electrolytic Solution | | |
| --- | --- | --- | --- | --- | --- |
| | Kind | Direction of Porous Layer | Supporting Electrolyte (mol/L) $LiPF_6$ | Nonaqueous Solvent (vol %) EC:EMC:DMC | Additive (mol/kg) $LiPO_2F_2$ |
| Comparative Example 1 | A | Facing Negative Electrode | 1.1 | 30:30:40 | 0.1 |
| Comparative Example 2 | A | Facing Positive Electrode | 1.1 | 30:30:40 | 0.1 |
| Comparative Example 3 | B | Facing Negative Electrode | 1.1 | 30:30:40 | — |
| Example 1 | B | Facing Positive Electrode | 1.1 | 30:30:40 | — |

<Measurement of Initial Characteristics>
Initial Capacity (Battery Capacity)

Each of the prepared battery assemblies was left to stand for a sufficient amount of time such that the electrode body was impregnated with the nonaqueous electrolytic solution. Next, in a temperature environment of 25° C., the battery assembly was charged and discharged in a voltage range of 3.0 V to 4.1 V according to the following steps (1) to (3). As a result, $LiPO_2F_2$ was electrically decomposed to form a film on surfaces of the positive and negative electrodes. At this time, the initial capacity was measured.

(1) The battery was charged at a constant current (CC charging) at a rate of 0.2 C until the voltage reached 4.1 V. Next, the battery was charged at a constant voltage (CV charging) until the current reached a rate of 0.01 C.

(2) The operation was stopped for 1 hour.

(3) The battery was discharged at a constant current (CC discharging) at a rate of 0.2 C until the voltage reached 3.0 V.

The discharge capacity (battery capacity) during CC discharging was calculated. Hereinafter, this battery capacity will be referred to as "SOC 100%".

Initial Resistance

In a temperature environment of 25° C., the battery was adjusted to SOC 56% and underwent CC discharging at a rate of 10 C for 10 seconds. The voltage drop amount at this time was divided by the current value to obtain an IV resistance.

<High-Temperature Storage Test>

In a temperature environment of 25° C., the battery was adjusted to SOC 80%. Next, the battery was stored (left to stand) in a thermostatic chamber at 60° C. for 61 days. The battery was taken out from the thermostatic chamber after 15 days, 39 days, and 61 days to measure the IV resistance using the same measurement method as that for the initial resistance. The results are shown in FIG. 4.

FIG. 4 shows the transition of the IV resistance when the initial resistance was standardized as 100. As shown in FIG. 4, in the battery of Comparative Example 3 in which the porous layer containing $LiPO_2F_2$ faced the negative electrode, an increase in resistance after the high-temperature storage was the largest. The reason is presumed to be that, in the battery of Comparative Example 3, an excess amount of the film was formed on the surface of the negative electrode. On the other hand, in the battery of Example 1 in which the porous layer containing $LiPO_2F_2$ faced the positive electrode, an increase in resistance after the high-temperature storage was the smallest. The reason is presumed to be that, in the battery of Example 1, local deterioration of the positive electrode was suppressed by forming a large amount of the stable film on the surface of the positive electrode.

[II. Investigation of Addition Amount of Fluorophosphate]

Here, the characteristics of the batteries were evaluated using the same method as that of "I." described above except for the addition amount of the fluorophosphate.

<Preparation of Separator>
Preparation of Separator C

Boehmite as an inorganic filler; $LiPO_2F_2$ as a fluorophosphate; an acrylic polymer as a binder; and CMC were weighed at a mass ratio of 91.2:4.0:2.4:2.4. These materials were dispersed or dissolved in water to prepare a paste composition for forming a porous layer. This composition was applied to a single surface of the separator substrate such that the coating amount thereof was 0.78 mg/cm² and was dried. In this way, the separator C was obtained including: the separator substrate; and the porous layer containing the fluorophosphate that was formed on the single surface of the separator substrate.

<Preparation of Battery Assembly>

The positive electrode and the negative electrode were wound with the separator interposed therebetween to prepare an electrode body (Comparative Examples 4 to 6 and Example 2). At this time, the kind and direction of the separator were configured as shown in Table 2 below. This electrode body was accommodated in a square battery case, and 40 g of a nonaqueous electrolytic solution having a composition shown in Table 2 below was injected into the battery case. As a result, battery assemblies (Comparative Examples 4 to 6 and Example 2) were prepared. In all the battery assemblies, the amount of $LiPO_2F_2$ contained therein was half of that in the battery assemblies of "I." described above (0.216 g=0.002 mol). For example, in Comparative Example 6 and Example 2, the amount of $LiPO_2F_2$ contained in the porous layer of the separator was designed to be 0.216 g.

TABLE 2

Configuration (2) of Battery Assembly

| | Separator | | Composition of Nonaqueous Electrolytic Solution | | |
|---|---|---|---|---|---|
| | Kind | Direction of Porous Layer | Supporting Electrolyte (mol/L) $LiPF_6$ | Nonaqueous Solvent (vol %) EC:EMC:DMC | Additive (mol/kg) $LiPO_2F_2$ |
| Comparative Example 4 | A | Facing Negative Electrode | 1.1 | 30:30:40 | 0.5 |
| Comparative Example 5 | A | Facing Positive Electrode | 1.1 | 30:30:40 | 0.5 |
| Comparative Example 6 | C | Facing Negative Electrode | 1.1 | 30:30:40 | — |
| Example 2 | C | Facing Positive Electrode | 1.1 | 30:30:40 | — |

<Measurement of Initial Characteristics and High-Temperature Storage Test>

Using the same method as that of "I." described above, the measurement of the initial characteristics and the high-temperature storage test were performed. The results are shown in FIG. 5. FIG. 5 shows the transition of the IV resistance when the initial resistance was standardized as 100. As shown in FIG. 5, in the batteries of Comparative Examples 6 to 8 and Example 2, an increase in resistance was larger than those in the batteries of Comparative Examples 1 to 3 and Example 1. The reason is presumed to be that the thickness of the film formed on the surface of the electrode was slightly reduced by reducing the amount of $LiPO_2F_2$ contained in the battery. In the battery of Example 2 in which the porous layer containing $LiPO_2F_2$ faced the positive electrode, an increase in resistance after the high-temperature storage was the smallest among the batteries of Comparative Examples 6 to 8 and Example 2. That is, it can be said that, even when the content of $LiPO_2F_2$ was changed (to be half of that in Example 1), the technique disclosed herein is efficient.

Hereinabove, specific examples of the invention have been described in detail. However, these examples are merely exemplary and do not limit the invention. The invention includes various modifications and alternations of the above-described specific examples.

What is claimed is:

1. A method of manufacturing a nonaqueous electrolyte secondary battery, the method comprising:
   preparing a separator substrate;
   preparing a separator by applying a paste or a slurry composition, which contains at least a fluorophosphate and a binder kneaded with each other in a solvent, to a surface of the separator substrate to form a porous layer on the surface of the separator substrate;
   preparing an electrode body by arranging the separator such that the porous layer faces a positive electrode and laminating the positive electrode and a negative electrode to face each other with the separator interposed therebetween;
   preparing a battery assembly comprising the electrode body and a nonaqueous electrolyte; and
   charging the battery assembly at least once.

2. The method according to claim 1, wherein
   the separator is prepared by preparing the composition further containing an inorganic filler and applying the composition to the separator substrate.

3. The method according to claim 1, wherein
   lithium difluorophosphate is used as the fluorophosphate.

4. The method according to claim 1, wherein
   an amount of the fluorophosphate and an amount of the nonaqueous electrolyte in the composition are adjusted such that a concentration of the fluorophosphate in the porous layer in terms of a concentration of the nonaqueous electrolyte is 0.05 mol/kg or more.

5. The method according to claim 1, wherein
   the nonaqueous electrolyte does not contain the fluorophosphate.

6. The method according to claim 1, wherein the fluorophosphate is fixed on the porous layer.

* * * * *